US010061665B2

(12) United States Patent
Mahindru et al.

(10) Patent No.: US 10,061,665 B2
(45) Date of Patent: *Aug. 28, 2018

(54) PRESERVING MANAGEMENT SERVICES WITH SELF-CONTAINED METADATA THROUGH THE DISASTER RECOVERY LIFE CYCLE

(71) Applicant: International Business Machines Corporation, Armonk, NY (US)

(72) Inventors: Ruchi Mahindru, Elmsford, NY (US); Harigovind V. Ramasamy, Ossining, NY (US); Soumitra Sarkar, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 34 days.

This patent is subject to a terminal disclaimer.

(21) Appl. No.: 15/131,381

(22) Filed: Apr. 18, 2016

(65) Prior Publication Data
US 2016/0232065 A1    Aug. 11, 2016

Related U.S. Application Data

(63) Continuation of application No. 14/268,046, filed on May 2, 2014, now Pat. No. 9,317,380.

(51) Int. Cl.
*G06F 11/20* (2006.01)
*H04L 29/08* (2006.01)
(Continued)

(52) U.S. Cl.
CPC ...... *G06F 11/2033* (2013.01); *G06F 11/2023* (2013.01); *G06F 11/2028* (2013.01);
(Continued)

(58) Field of Classification Search
CPC ............. G06F 11/1451; G06F 11/2058; G06F 11/2069; G06F 11/0712; G06F 11/0751;
(Continued)

(56) References Cited

U.S. PATENT DOCUMENTS 6,163,856 A * 12/2000 Dion .................. G06F 11/2064
709/213
7,275,177 B2 * 9/2007 Armangau .......... G06F 11/2074
707/999.202

(Continued)

FOREIGN PATENT DOCUMENTS

WO    WO2007008296    1/2007

OTHER PUBLICATIONS

Peter Mell & Tim Grance, "The NIST Definition of Cloud Computing", Version 15, Oct. 7, 2009, Computer Security Division Information Technology Laboratory, National Institute of Standards and Technology, Sep. 2011, p. 1-2.

(Continued)

*Primary Examiner* — Nadeem Iqbal
(74) *Attorney, Agent, or Firm* — Louis J. Percello; Otterstedt, Ellenbogen & Kammer, LLP

(57) ABSTRACT

During normal operation, at a first site, of a disaster recovery management unit, at least one customer workload machine, at least one management service machine, and metadata for the at least one management service machine are replicated to a remote disaster recovery site. After a disaster at the first site, a replicated version of the at least one customer workload machine and a replicated version of the at least one management service machine are brought up at the remote disaster recovery site. A replicated version of the metadata for the at least one management service machine is reconfigured by executing, on the replicated version of the at least one management service machine, a failover script, to obtain (Continued)

reconfigured replicated metadata for the replicated version of the at least one management service machine. When the first site comes back up, failback is carried out, essentially in the reverse order.

20 Claims, 10 Drawing Sheets

(51) Int. Cl.
*H04L 29/14* (2006.01)
*G06F 11/30* (2006.01)

(52) U.S. Cl.
CPC ...... *G06F 11/2048* (2013.01); *G06F 11/2097* (2013.01); *H04L 67/10* (2013.01); *H04L 67/1095* (2013.01); *H04L 67/1097* (2013.01); *H04L 69/40* (2013.01); *G06F 11/2025* (2013.01); *G06F 11/302* (2013.01); *G06F 11/3003* (2013.01); *G06F 2201/805* (2013.01); *G06F 2201/815* (2013.01); *G06F 2201/865* (2013.01)

(58) Field of Classification Search
CPC ............. G06F 11/2025; G06F 11/2035; G06F 11/2046; G06F 11/2074; G06F 11/2094
See application file for complete search history.

(56) References Cited

U.S. PATENT DOCUMENTS

| | | | | |
|---|---|---|---|---|
| 7,373,468 | B1* | 5/2008 | Gupta | G06F 17/30578 707/999.202 |
| 7,600,146 | B2* | 10/2009 | Liccione | G06F 11/2023 714/15 |
| 8,276,016 | B2 | 9/2012 | D'Souza | |
| 8,775,394 | B2* | 7/2014 | Smoot | G06F 11/2069 707/674 |
| 8,990,153 | B2 | 3/2015 | Wayda et al. | |
| 9,305,010 | B1 | 4/2016 | Faibish et al. | |
| 9,317,380 | B2* | 4/2016 | Mahindru | G06F 11/2023 |
| 9,417,976 | B2 | 8/2016 | Sugabrahmam et al. | |
| 2007/0185934 | A1 | 8/2007 | Cannon | |
| 2007/0234342 | A1* | 10/2007 | Flynn, Jr. | G06F 9/4856 717/174 |
| 2008/0080497 | A1 | 4/2008 | Meijer | |
| 2011/0047548 | A1 | 2/2011 | Traut | |
| 2011/0178983 | A1* | 7/2011 | Bernhard | G06F 11/08 707/610 |
| 2012/0203742 | A1 | 8/2012 | Goodman et al. | |
| 2012/0284707 | A1 | 11/2012 | Janakiraman | |
| 2014/0040206 | A1* | 2/2014 | Ramakrishnan | G06F 11/2097 707/640 |
| 2014/0040658 | A1 | 2/2014 | Adler et al. | |
| 2014/0372378 | A1 | 12/2014 | Long et al. | |
| 2015/0195178 | A1 | 7/2015 | Bhattacharya et al. | |
| 2015/0317222 | A1 | 11/2015 | Mahindru et al. | |
| 2016/0004603 | A1 | 1/2016 | Lakshman | |
| 2016/0062858 | A1 | 3/2016 | Gallagher et al. | |
| 2016/0239396 | A1* | 8/2016 | Deng | G06F 11/2007 |

OTHER PUBLICATIONS

Prasad Calyam, Phani Kumar Arava, Nathan Howes, Siddharth Samsi, Chris Butler, Jeff Jones, "Network Tuning and Monitoring for Disaster Recovery Data Backup and Retrieval", OSC Technical Whitepaper, 2005, pp. 1-9.

Yu Deng, "Preserving Management Services With Distributed Metadata Through the Disaster Recovery Life Cycle", unpublished U.S. Appl. No. 14/623,013, filed Feb. 16, 2015, pp. 1-46 plus 13 shets formal drawings.

Yu Deng, Unpublished U.S. Appl. 14/948,312, filed Nov. 21, 2015, Preserving Management Services With Distributed Metadata Through the Disaster Recovery Life Cycle , pp. 1-42 plus 13 sheets formal drawings.

List of IBM Patents or Patent Applications Treated as Related.

* cited by examiner

US 10,061,665 B2

PRESERVING MANAGEMENT SERVICES WITH SELF-CONTAINED METADATA THROUGH THE DISASTER RECOVERY LIFE CYCLE

CROSS-REFERENCE TO RELATED APPLICATIONS

This application is a continuation of U.S. patent application Ser. No. 14/268,046 filed May 2, 2014, the complete disclosure of which is expressly incorporated herein by reference in its entirety for all purposes.

STATEMENT OF GOVERNMENT RIGHTS

Not Applicable.

FIELD OF THE INVENTION

The present invention relates to the electrical, electronic and computer arts, and, more particularly, to information technology and the like.

BACKGROUND OF THE INVENTION

Disaster recovery (DR) refers to the preparation for recovery or continuation of vital information technology infrastructure after a disaster. Current disaster recovery techniques primarily address state maintenance of servers and storage for servers and applications.

SUMMARY OF THE INVENTION

Principles of the invention provide techniques for preserving management services with self-contained metadata through the disaster recovery life cycle. In one aspect, an exemplary method includes the step of, during normal operation, at a first site, of a disaster recovery management unit comprising at least one customer workload machine and at least one management service machine, replicating to a remote disaster recovery site the at least one customer workload machine, the at least one management service machine, and metadata for the at least one management service machine. Additional steps include, after a disaster at the first site, bringing up, at the remote disaster recovery site, a replicated version of the at least one customer workload machine; bringing up, at the remote disaster recovery site, a replicated version of the at least one management service machine; and reconfiguring a replicated version of the metadata for the at least one management service machine by executing on the replicated version of the at least one management service machine a failover script, to obtain reconfigured replicated metadata for the replicated version of the at least one management service machine. Thus, the replicated version of the at least one management service machine can provide the management service to the replicated version of the at least one customer workload machine in the remote disaster recovery site.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
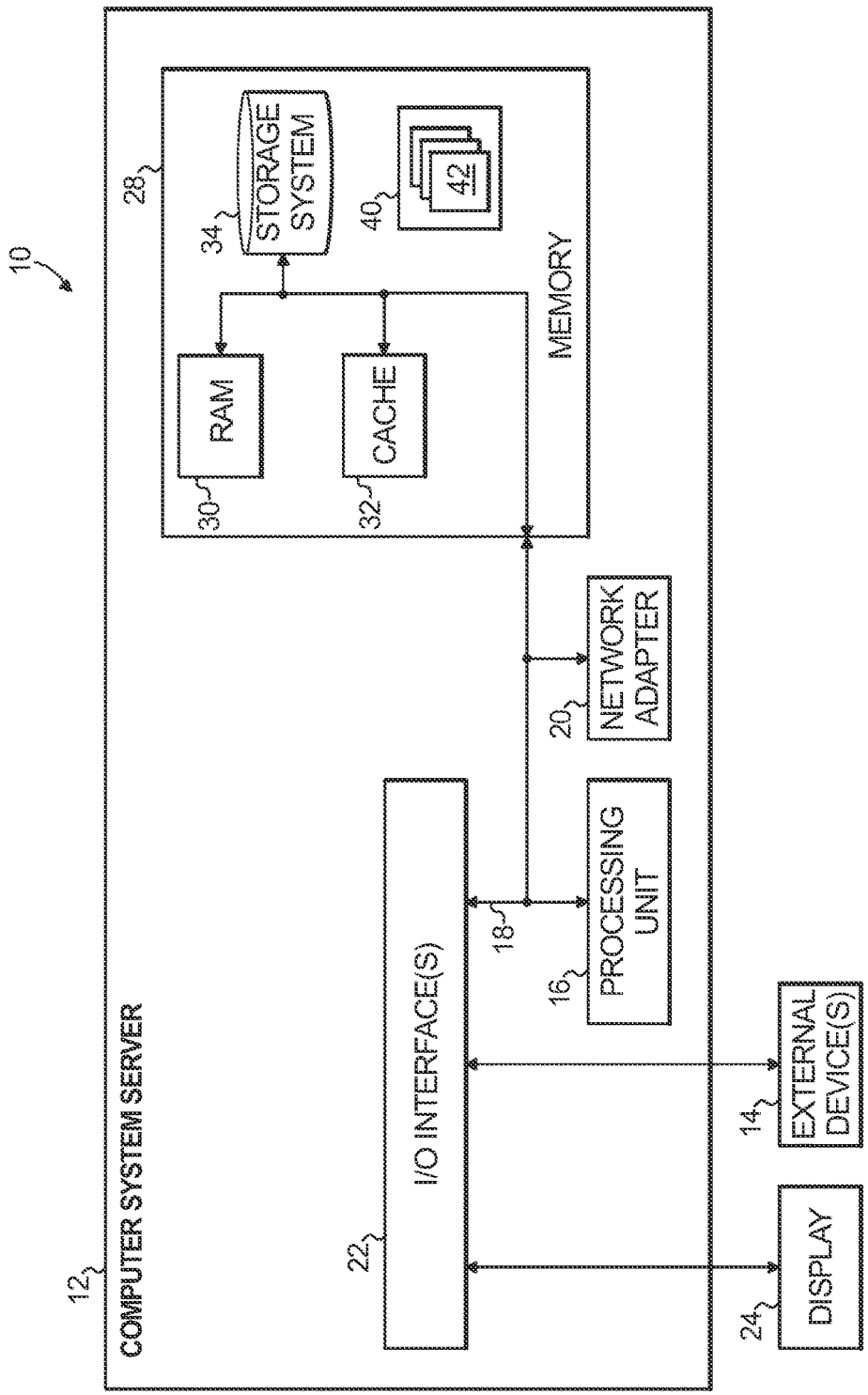
FIG. 1 depicts a cloud computing node according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Figure 2:
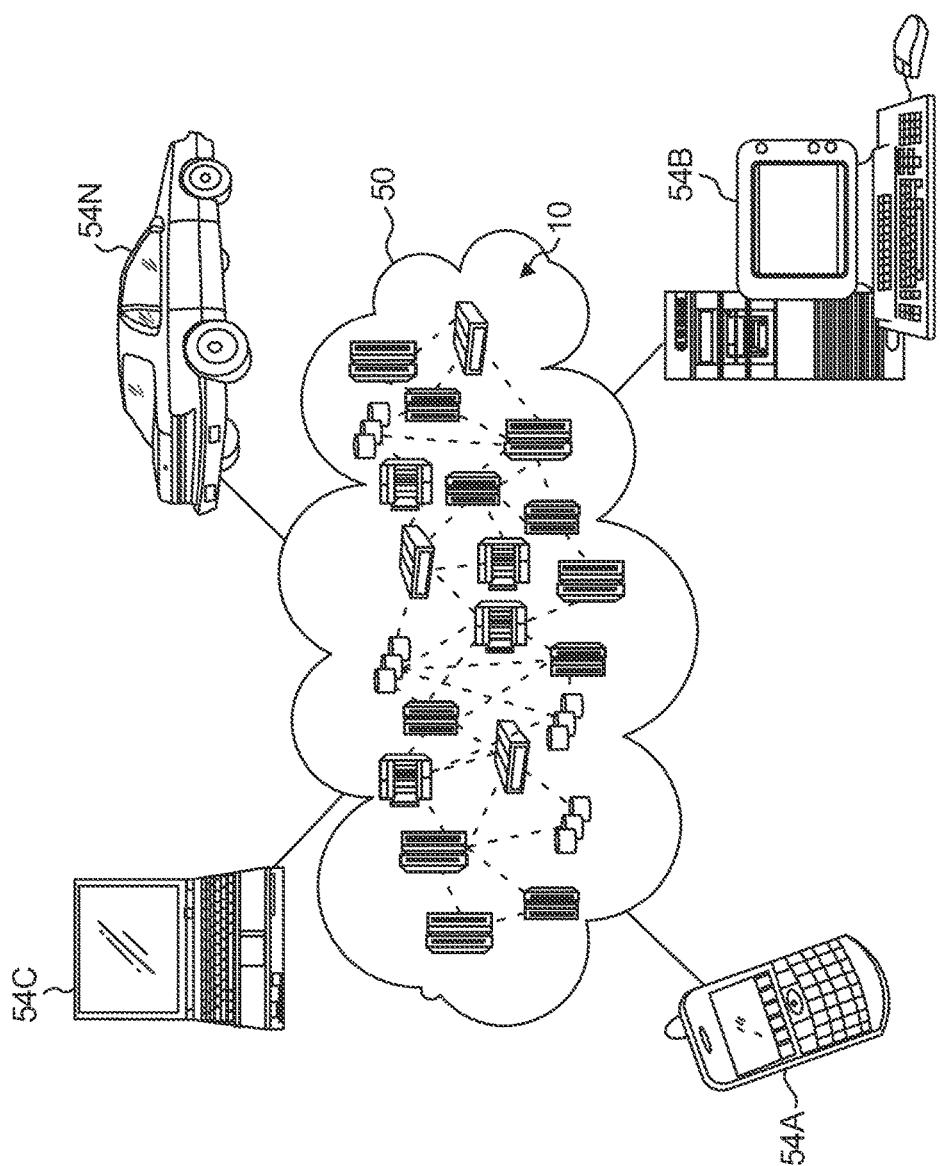
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
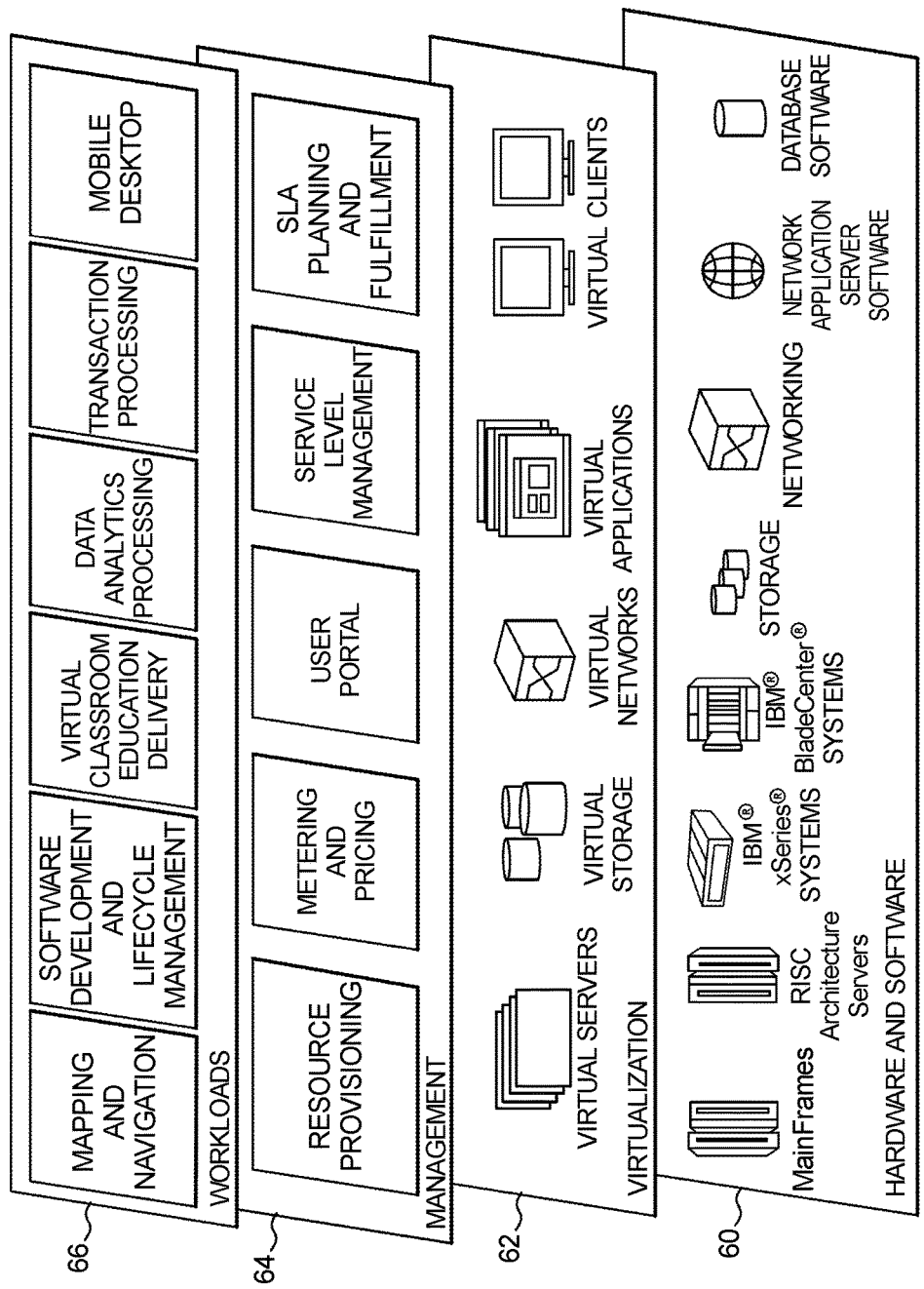
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

As noted, disaster recovery (DR) refers to the preparation for recovery or continuation of vital information technology infrastructure after a disaster. Current disaster recovery techniques primarily address state maintenance of servers and storage for servers and applications.

Advantageously, one or more embodiments provide an approach to preserve monitoring and event management services for failed-over systems in the recovery site after a disaster. One or more embodiments apply to managed services whose meta-data that is impacted by the DR failover/failback process is contained within the managed service itself (self-contained).

At least some embodiments can be extended to other management services, e.g., patch management, license management, asset management.

In some cases, each management service maintains meta-data including that required for multi-tenancy support. This meta-data, in some embodiments, has to be replicated with a higher recovery point objective (RPO) (no-loss), and, after the DR, the meta-data has to be fixed up based on the state of the recovered virtual machines (VMs).

One or more embodiments are applicable to disaster recovery in both cloud environments and traditional (non-virtualized) data centers, including those with multi-tenancy such as hosting services.

Thus, when managed services are employed in an IT environment, the management layer 64 needs to be failed over to the disaster recovery site in the event of an outage. Monitoring is one non-limiting example of a management layer function. Typically, each of the managed services maintains some metadata, such as endpoints, customer virtual machines (VMs), and so on. In the case of event management, the metadata will be the policies that specify what is to be done upon the occurrence of certain events. In one or more embodiments, this metadata is failed over and fixed up (also referred to herein as "reconfigured") in the recovered VM(s) in the disaster recovery site.

As noted, current disaster recovery techniques primarily cover state maintenance of servers and applications such as storage for servers and applications. From a cloud perspective, these servers and applications are typically managed entities. Advantageously, one or more embodiments extend DR to the state maintenance of the managing entities. Some embodiments reuse some existing techniques such as storage replication that are used for the managed entities; however, these existing techniques are modified in one or more embodiments to provide additional pre-failover configuration and post-failover processing.

Again, it is to be emphasized that monitoring and/or event management are non-limiting exemplary applications; patching, identity management, asset management, and discovery processing are other non-limiting examples. In a cloud environment, as noted, there is a management layer 64 where there are tools running to manage the cloud: monitoring, patching, identity management, asset management, and so on. When a disaster occurs, there is a transition from the site where the disaster has occurred to the disaster recover site; as part of this process, management layer 64 is failed over to the disaster recovery (failover) site. Failover of VMs, file structures, and the like are known from prior art. As noted, each of the management services typically maintains some metadata. Again, in the example of monitoring, metadata includes VMs, infrastructure layer, and the tools in the management stack; in the example of event management, metadata includes policies setting forth what needs to be done when an event comes in for a specific customer. An example of this includes automation policies per customer—certain automated remediation actions are taken if something happens on the customer's VM; e.g., a file system problem. Another example of meta-data includes the severity, threshold, sampling interval, and persistence that should be used to raise an alert for a customer VM. Another example of meta-data includes automation policies per customer that should determine how and where the event should be ticketed and routed.

Typically, data must be failed over and fixed up in the recovered VM in the failover site.

It is important to note that one or more embodiments are directed to failover for the items that manage the customer's workload as opposed to the customer's workload per se.

Figure 4:
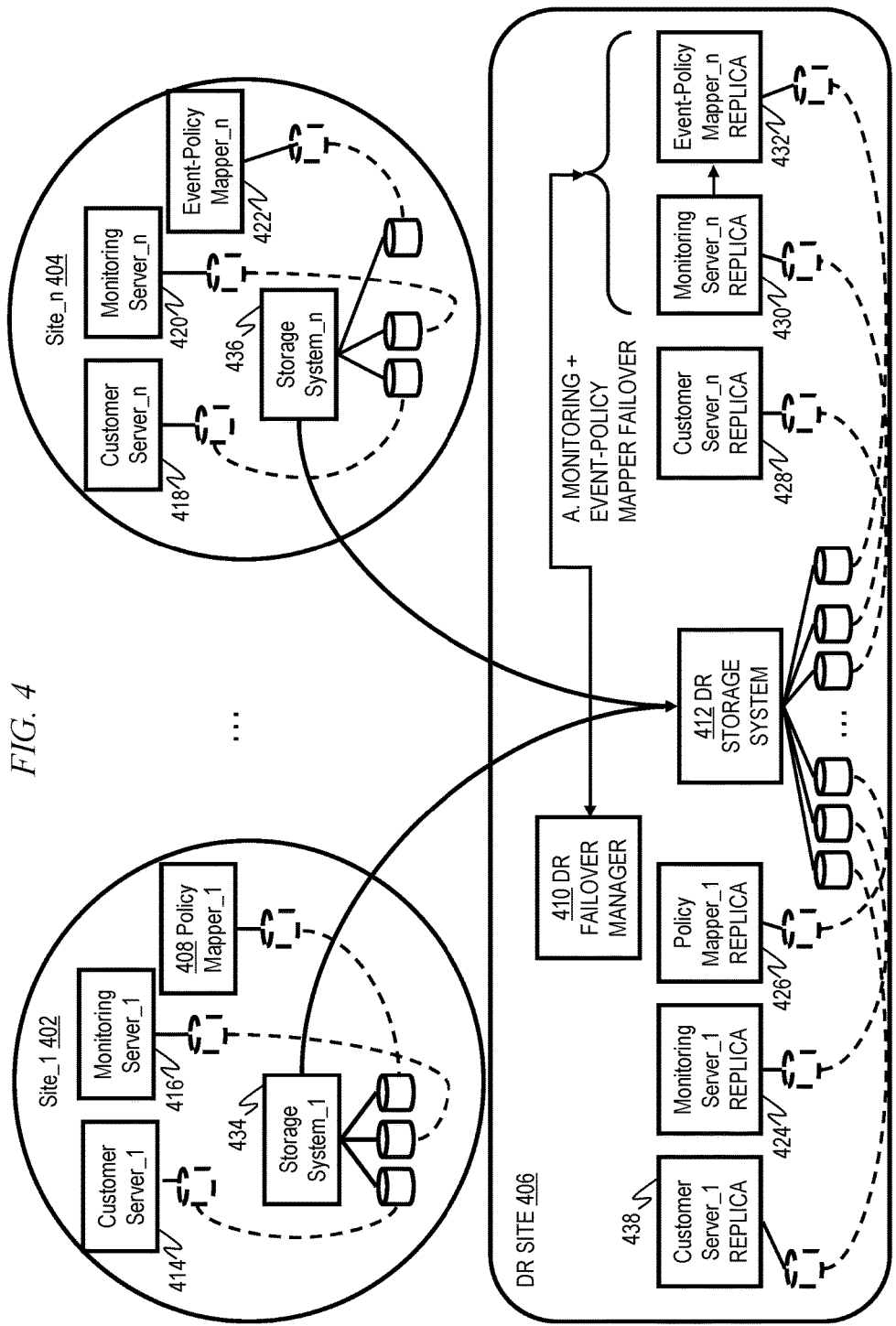
FIG. 4 depicts failover in a disaster recovery system with a monitoring scenario and asynchronous storage replication, according to an embodiment of the present invention.

Attention should now be given to FIG. 4, which depicts failover in a disaster recovery system with a monitoring scenario and asynchronous storage replication. Note two sites 402, 404 where customer workloads are running—these can be cloud or non-cloud sites, and there can be any number of sites, as indicated by the ellipsis. Replicas reside at disaster recovery (DR) site 406.

More particularly, first site 402, also designated as Site_1, includes Customer Server_1, designated as 414, Monitoring Server_1, designated as 416, and Policy Mapper_1, designated as 408, all coupled to Storage System_1, designated as 434. Furthermore, $n^{th}$ site 404, also designated as Site_n, includes Customer Server_n, designated as 418, Monitoring Server_n, designated as 420, and Event-Policy Mapper_n, designated as 422, all coupled to Storage System_n, designated as 436. Disaster recovery (DR) site 406 includes Customer Server_1 replica, designated as 438, Monitoring Server_1 replica, designated as 422, and Policy Mapper_1, designated as 426, all coupled to the DR storage system, designated as 412. Furthermore, DR site 406 further includes Customer Server_n replica, designated as 428, Monitoring Server_n replica, designated as 430, and Event-Policy Mapper_n replica, designated as 432, also all coupled to the DR storage system 412. Finally, DR site 406 includes DR failover manager 410 which orchestrates the failover process; the failover process includes not only conventional failover of the workloads but also of the monitoring servers 416, 420 and the policy mappers 408, 422.

Note that in general, a "PoD" (point of deployment) is a unit of management, and a site 402, 404 can, in general, include one or more PoDs. In order to be a management unit for disaster recovery purposes, there should be a centralized repository of MS (monitoring server) instances and topology. One or more embodiments employ per-MS configuration fix-up scripts for failover and failback, and make use of MS APIs (application program interfaces).

In FIG. 4, the asynchronous storage system replication is indicated by the bold curved arrows from the storage systems 434, 436 to the DR storage system 412. Software based replication also applies to one or more embodiments.

In normal operation, the customer servers 414, 418 (which, in general, can be real or virtual, although of course even virtual servers ultimately reside on one or more real machines) run one or more customer workloads. The monitoring servers 416, 420 monitor those workloads and detect events. The policy mappers 408, 422 work closely with the monitoring servers 416, 420 to initiate action in response to the events detected by the servers 416, 420 according to the corresponding mapping between events and policies. Each of the servers and mappers in the sites 402, 404 is asynchronously (not real time) replicated in the DR site 406.

When a disaster occurs (e.g., power outage), the workload and at least a subset of the servers are brought up at DR site 406. The customer servers can be brought up one-by-one by using the replicated volume. However, while, say, a server is now "up" to handle the workload, it is not being monitored; alerts are not being generated. In one or more embodiments, to address bringing up the managed service(s), monitoring servers and policy mappers have also been replicated, as seen at 424, 426, 430, 432 and eventually are brought up as well. However, endpoint addresses have changed—therefore, the replicas can't immediately monitor the replicated servers in the DR site 406; a fix-up is needed so that they can monitor the replicated servers in the DR environment. One or more embodiments employ metadata to facilitate the fix-up process.

Figure 5:
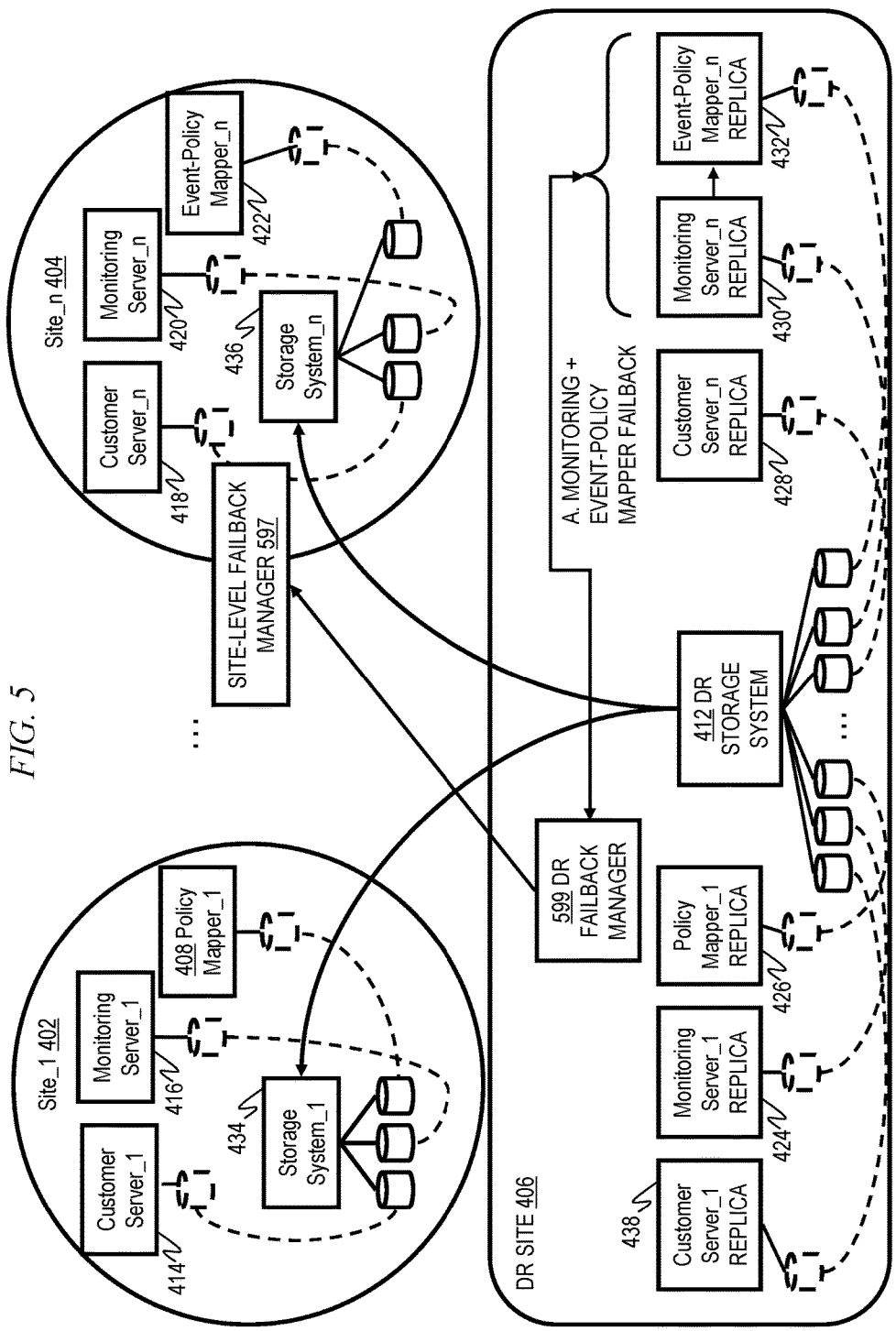
FIG. 5 depicts failback in a disaster recovery system with a monitoring scenario and asynchronous storage replication, according to an embodiment of the present invention.

FIG. 5 depicts failback in the disaster recovery system with monitoring scenario and asynchronous storage replication of FIG. 4. When the main site (here, Site_n 404) comes back up, begin background replication as indicated by the bold arrows from DR storage system 412 to storage systems 434, 436. For the avoidance of doubt, FIG. 5 depicts a condition wherein only Site_n is shown as being down. When this replication is complete, the reverse of the process described with regard to FIG. 4 is carried out, including for the monitoring servers and event policy mappers. Using site-level failback manager 597 and DR failback manager 599, start the machines at site 404, and eventually shut off the machines in DR site 406. Again, endpoint addresses have changed back to original—therefore, the reconstituted servers 420, 422 can't immediately monitor the reconstituted server 418 in the site 404; a fix-up is needed so that they can monitor the reconstituted server(s) in the site 404. One or more embodiments employ metadata to facilitate this fix-up process, as well.

It will be appreciated that at least some managed services run (as one or more VMs) independently of customer VMs, and that metadata and/or state is local to the managed service. In one or more embodiments, operations to enable failover after PoD failure and failback once the PoD is again operational are as follows:

Steady state: Continuous (optionally asynchronous) replication of state of PoD-MS 420 to DR site Failover: Extraction of state from MS replica 430, and subset+merge with DR-MS instance 430

Failback: Optionally merge the state of DR-MS instance 430 with PoD-MS state 420 in replica of site 404

As noted, one or more embodiments use metadata to facilitate management services after disaster recovery. One simple example is in the case of a firewall. The metadata includes the rules in the firewall policy file. These rules become invalid when the firewall is moved to the DR site 406, because there are new IP addresses. A simple map of the IP addresses associated with site 404 to those associated with DR site 406 can be used for the fix-up.

Figure 6:
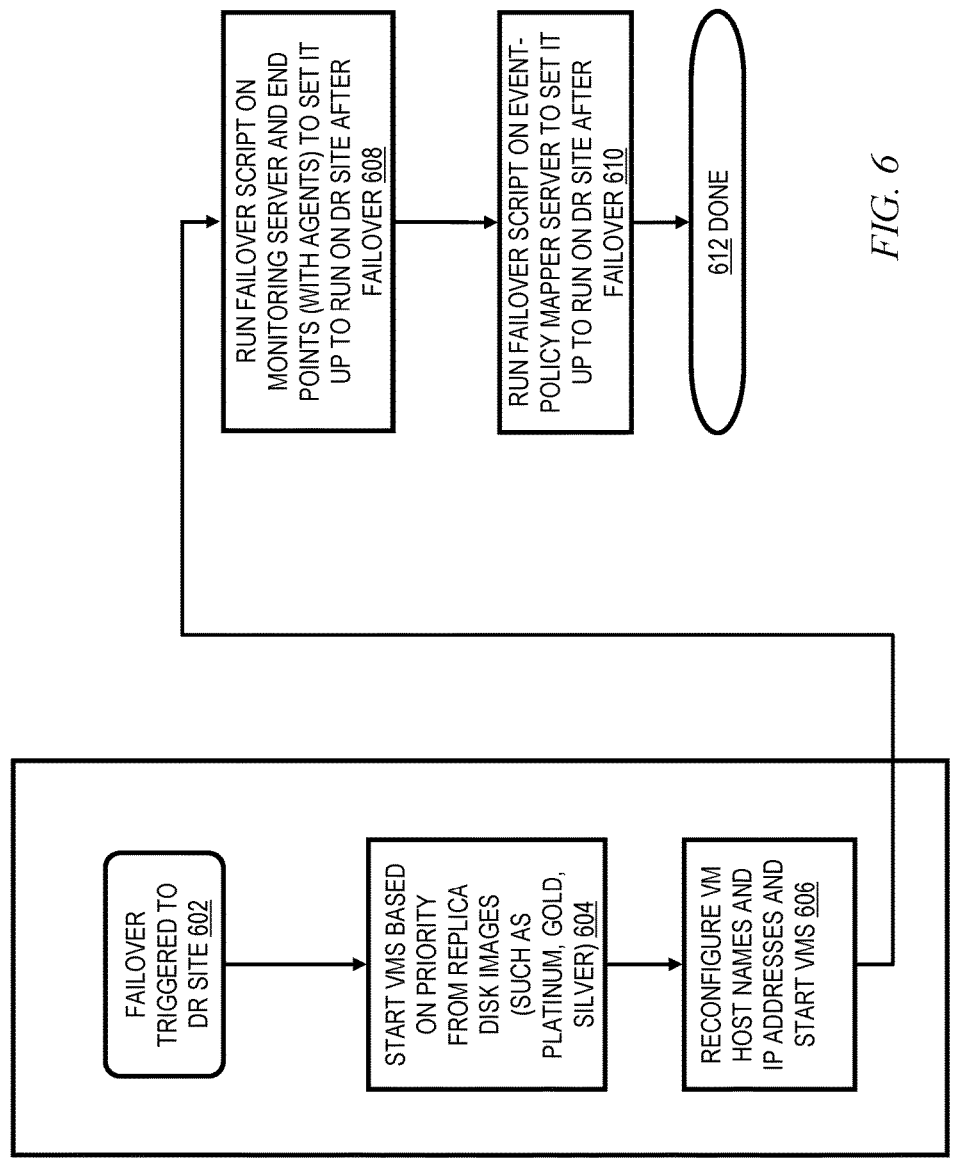
FIG. 6 is a flow chart of disaster recovery failover for monitoring, according to an embodiment of the present invention.

The metadata is more complex where the failed-over managed service is a monitoring service. Typically, the metadata in such a case is internally represented in non-relational databases. One or more embodiments leverage application program interface(s) (API(s)) provided by the monitoring services. An agent is installed on the VM to be monitored, together with appropriate rules. When provisioning the VM, it is set up for monitoring. It is worth noting that IBM TIVOLI MONITORING software available form International Business Machines Corporation, Armonk, N.Y., USA, is one non-limiting example of software that could be run on servers 416, 420, 912, 424, 430, 914 (FIG. 9 is discussed elsewhere herein). This TIVOLI software has commands that can be used to set a VM up for monitoring. Note that elements 414, 418, 438, 428 are customer virtual machines but they do not necessarily have to be virtual; they could be physical in some circumstances. FIG. 6 is a flow chart of disaster recovery failover for monitoring. In step 602, failover to the DR site 406 is triggered. In step 604, start VMs in DR site 406 based on priorities from replica disk images (e.g., "Platinum," "Gold," "Silver"). In step 606, reconfigure the VM host names and IP addresses and start the VMs in DR site 406. Steps 602, 604, and 606 are analogous to those known from the prior art. In step 608, run a failover script on monitoring server 420 and customer VM (with agents) to set the monitoring server replica 430 up to run on DR site 406 after failover. FIG. 6 shows the steps in a typical chronological order. Non-limiting exemplary details of step 608 are given in FIG. 7. In step 610, run a failover script on Event-Policy Mapper server 422 to set the Event-Policy Mapper server replica 432 up to run on DR site 406 after failover. Non-limiting exemplary details of step 610 are given in FIG. 8. Processing ends at 612.

Furthermore in this regard, in one or more embodiments, each of the servers 416, 408, 420, 422, 424, 426, 430, and 432 is provided with a failover script and a failback script. The scripts can be written, for example, in Perl, Java, or any other suitable current programming language. Furthermore, each VM (or physical machine) monitored by each monitoring server is provided with an agent. Refer to servers 414, 418, 438, 428. The agents are registered on machines 416, 420, 424, 430 respectively. Additionally, the agents installed on machines 414, 418, 438, 428 report the collected metrics to the monitoring servers 416, 420, 424, 430, respectively. Steps 608, 610 are repeated for each managed service.

Figure 7:
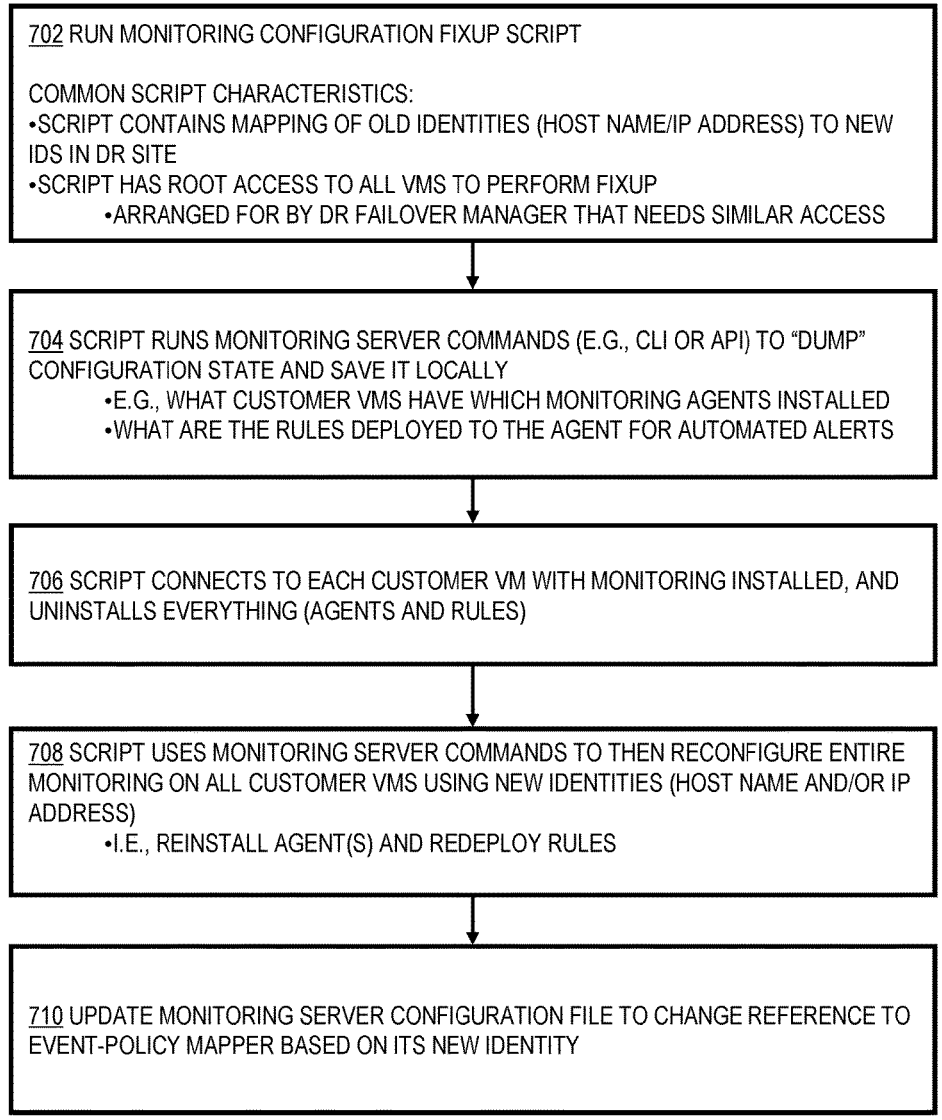
FIG. 7 is a detailed flow chart of one possible manner of carrying out step 608 in FIG. 6, according to an embodiment of the present invention.

FIG. 7 is a detailed flow chart of one possible manner of carrying out step 608 in FIG. 6. In a non-limiting exemplary embodiment, at 702, run a monitoring configuration fix-up script on server 430. The script typically has certain common script characteristics; for example, the script contains a mapping of old identities (host name and/or IP address in site 404) to new IDs in DR site 406; the script has root access to all VMs to perform fix-up; and this is arranged for by DR failover manager 410, which needs similar access. At 704, the script runs monitoring server commands (e.g., command line interface (CLI) or API) to "dump" configuration state and save it locally in 424 (e.g., what customer VMs have which monitoring agents installed and/or what rules are deployed to the agent for automated alerts). At 706, the script connects to each customer VM 428 with monitoring installed, and uninstalls existing agents and rules. In step 708, the script uses monitoring server commands to then reconfigure the entire monitoring on all customer VMs using new identities (host name and/or IP address); i.e., to reinstall agent(s) and redeploy rules. This can optionally be done in a batch process. In step 710, update the monitoring server configuration file to change reference to the Event-Policy Mapper 422 based on its new identity 432. In one or more embodiments, appropriate scripts and/or agents run in site 406 after a disaster has occurred.

Figure 8:
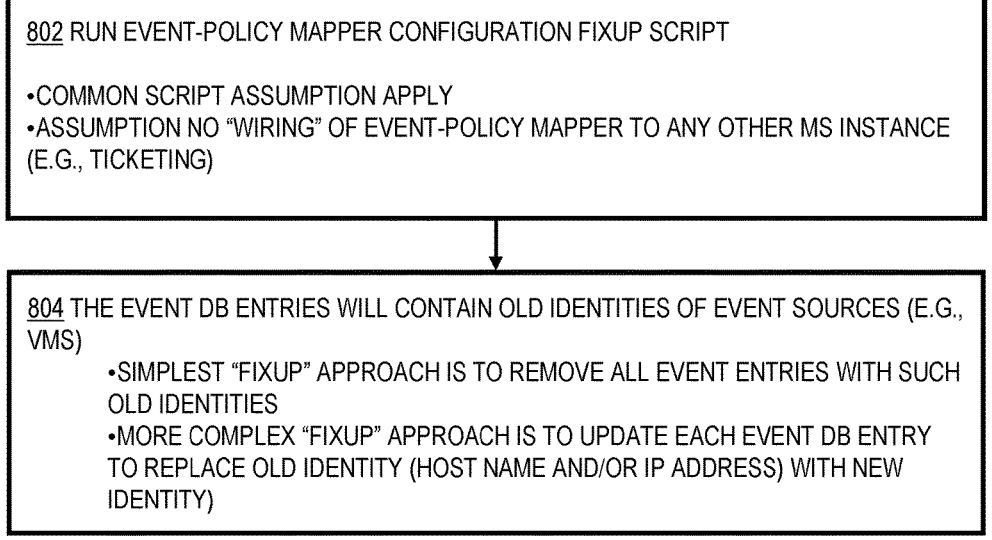
FIG. 8 is a detailed flow chart of one possible manner of carrying out step 610 in FIG. 6, according to an embodiment of the present invention.
Figure 9:
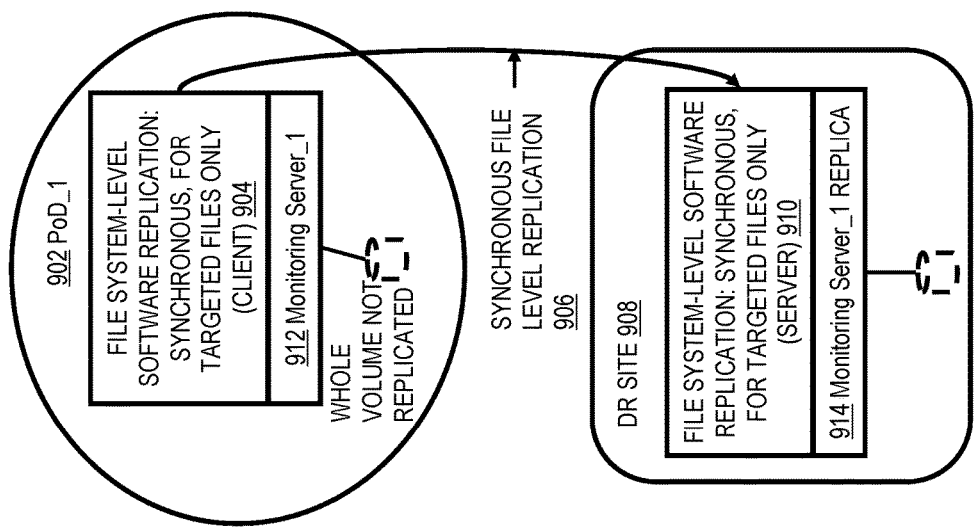
FIG. 9 depicts synchronous file level replication, according to an embodiment of the present invention.

FIG. 8 is a detailed flow chart of one possible manner of carrying out step 610 in FIG. 6. In step 802, run an event-policy mapper configuration fix-up (failover) script on server 432. Servers 408, 422 typically have limited metadata, but do have a list (database or DB) of events wherein the sources (e.g., VMs) are identified by the old addresses in site 404. In one or more embodiments, common script assumption apply; for example, assume no "wiring" of the Event-Policy Mapper to any other MS instance (e.g., ticketing). In step 804, the event DB entries contain old identities of event sources (e.g., VMs). The simplest "fix-up" approach is typically to remove all event entries with such old identities. A more complex "fix-up" approach is to update each event DB entry to replace the old identity (host name and/or IP address) with the new identity.

Consider the case of failback for monitoring, referring again to FIG. 5. Heretofore, in current systems, for each customer VM, the logical units (LUs) of the VM disks are replicated from the DR site to the "$n^{th}$" PoD "PoD_n." Once synch-up is nearly complete, the managed VM is taken to a quiescent state, final synch-up is completed, and the customer VM in PoD_n is started. In some instances, this latter step might have to be delayed.

In one or more embodiments of the invention, which utilize a monitoring server and policy mapper, delay the step of starting the customer VM 418 in PoD_n 404 for managed VMs. For the monitoring server VM, reverse merge the config (configuration file) of the DR site's monitoring server 430 to the PoD_n monitoring server config replica 420. Reverse merge of configurations into the monitoring server is typically only done for the customer system groups corresponding to PoD_n managed VMs. During the configuration merge, it may be the case that new rules were defined and/or some rules were deleted or modified in the DR site 406. The original IP address for each record is still valid; no change is required. Replicate the LU of the PoD_n monitoring server to PoD_n. In one or more embodiments, IP address fix-ups are not required because the monitoring server has the old IP address that is valid in the primary site 404.

The steps just described are repeated for the policy mapper VM 432 being failed back to the replicated machine 422.

The customer VMs are started in PoD_n 404. Management of these VMs is then commenced. Note that reversing the starting and managing for these VMs could potentially lead to complexity in managing systems. For example, the new rules that were added while PoD_n in 406 will not be evaluated, deleted rules that were removed while in PoD_n in 406 will continue to be evaluated or rules that were modified in PoD_n in 406 will evaluate incorrectly.

FIG. 9 depicts synchronous file level replication. In one or more embodiments, storage system volumes are dedicated to VMs. However, VMWare VMFS is a counter-example to this case. VMware VMFS (Virtual Machine File System) is a cluster file system available from VMware, Inc. of Palo Alto, Calif., USA. Other embodiments can be adopted for use with VMware VMFS and similar systems. For example, mount the VMFS file in loopback mount mode. With asynchronous replication, the contents of the master (Monitoring Server_1 912 in PoD_1 902) are not up to date with the DR replica (Monitoring Server_1 replica 914 in DR site 908), as indicated by the notation "whole volume not replicated." The lag determines RPO. If the monitoring and/or policy server configuration is updated, DR site 908 will not "see" this for some predetermined time period; say, "X" seconds. If a PoD disaster occurs between configuration update and replica update, the DR site will not restart with the latest PoD configuration. One possible approach is to employ limited synchronous replication 906.

The skilled artisan will appreciate that different management services will have different types of metadata. In the case of monitoring and event management, monitoring metadata typically includes rules to determine when metrics from an entity indicate incidents (events), while event management metadata includes customer specific policies regarding automated ticket handling (ticketing system, support group, severity, etc.) in response to incidents (events). In the case of patch management, metadata includes the entity to be patched, current patch level, patch priority and schedule, and the like. In the case of firewalls, metadata includes allowing/disallowing inbound/outbound traffic to/from specific networking endpoints (IP addresses and ports).

Figure 10:
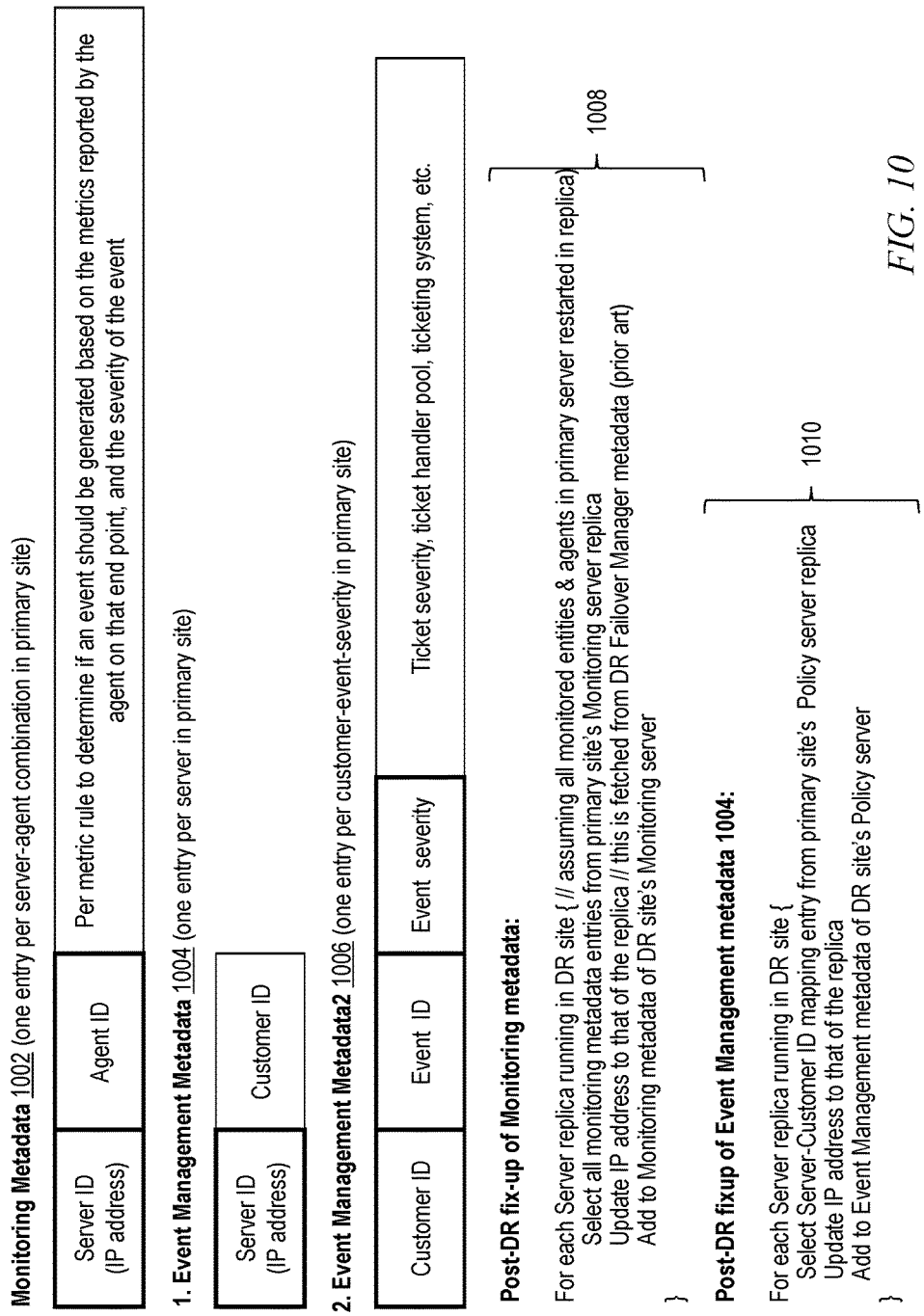
FIG. 10 shows exemplary meta-data for a monitoring example, according to an aspect of the invention.

FIG. 10 shows non-limiting exemplary meta-data; in particular, monitoring meta-data 1002, first event management meta-data 1004; and second event management meta-data 1006. Post-disaster recovery fix-up of monitoring meta-data is shown at 1008. Post-disaster recovery fix-up of event management meta-data 1004 is shown at 1010.

The skilled artisan will appreciate that many other cases can be handled by the self-contained meta-data approach in addition to the non-limiting exemplary embodiment. For example, consider a virtual load balancing firewall running in a fully-managed, highly secure IaaS cloud such as IBM SMART CLOUD ENTERPRISE PLUS available from International Business Machines Corporation, Armonk, N.Y., USA. Consider such a load balancing firewall running on a VM, one per customer. In a non-limiting exemplary embodiment, each entry is of the following form:

Key=Source IP address/subnet, Dest. IP addr./subnet, destination port, protocol

Value=allow/disallow (access)

After DR, typically, only a subset of the entries will be relevant and the destination as well as the source internet protocol (IP) addresses will need fix-up. For example, the managing systems could be the source.

Given the discussion thus far, it will be appreciated that, in general terms, an exemplary method, according to an aspect of the invention, includes the step of during normal operation, at a first site 404, of a disaster recovery management unit comprising at least one customer workload machine (physical or virtual) 418 and at least one management service machine (physical or virtual) 420, 422, replicating to a remote disaster recovery site the at least one customer workload machine, the at least one management service machine, and metadata for the at least one management service machine. Further steps include, after a disaster at the first site, bringing up, at the remote disaster recovery site, a replicated version of the at least one customer workload machine (physical or virtual) 428; bringing up, at the remote disaster recovery site, a replicated version of the at least one management service machine (physical or virtual) 430, 432; and reconfiguring a replicated version of the metadata for the at least one management service machine by executing on the replicated version of the at least one management service machine a failover script, to obtain reconfigured replicated metadata for the replicated version of the at least one management service machine. Thus, the replicated version of the at least one management service machine can provide the management service to the replicated version of the at least one customer workload machine in the remote disaster recovery site.

In some cases, a further step includes, subsequent to the disaster, upon the first site coming back up, background replicating from the remote disaster recovery site back to the first site a restored version of the at least one customer workload machine, a restored version of the at least one management service machine, and a restored version of the metadata for the at least one management service machine. In such cases, further steps include, once the background replication is complete, bringing up, at the first site, the restored version of the at least one customer workload machine (physical or virtual) (e.g., 418 restored); bringing up, at the first site, the restored version of the at least one management service machine (physical or virtual) (e.g., 420, 422 restored); and reconfiguring the restored version of the metadata for the at least one management service machine by executing on the restored version of the at least one management service machine a failback script, to obtain reconfigured restored metadata for the restored version of the at least one management service machine. Thus, the restored version of the at least one management service machine can provide the management service to the restored version of the at least one customer workload machine in the first site.

The disaster recovery management unit can be located within a cloud environment and/or within a non-cloud environment.

In some cases, in the replicating step, the at least one customer workload machine and the at least one management service machine comprise physical machines. However, in some cases, in the replicating step, the at least one customer workload machine and the at least one management service machine comprise virtual machines executing on one or more physical machines under control of a hypervisor.

In some instances, in the replicating step, the at least one management service comprises monitoring and event management functionality implemented with monitoring and policy mapper servers.

In some cases, the reconfiguring step 608 is implemented by uninstalling agents and rules from the replicated version of the at least one customer workload machine in the remote disaster recovery site, as at 706; reinstalling the agents and redeploying the rules on the replicated version of the at least one customer workload machine in the remote disaster recovery site, using at least one of new host names and new internet protocol addresses appropriate for the remote disaster recovery site, as at 708; and updating a configuration file of the replicated version of the at least one management service machine to point to a replicated policy mapper server in the remote disaster recovery site, as at 710.

In some cases, in the replicating step, the at least one management service comprises a firewall.

In some such cases, the reconfiguring (fixing up) step comprises applying a map of first site to remote disaster recovery site internet protocol addresses.

In the replicating step, the at least one management service can include, for example, patch management, license management, or asset management.

In some instances, the replication comprises asynchronous replication. However, in some cases, the replication comprises synchronous replication for at least targeted files of the disaster recovery management unit. Refer to FIG. 9.

One or more embodiments of the invention, or elements thereof, can be implemented in the form of an apparatus including a memory and at least one processor that is coupled to the memory and operative to perform exemplary method steps.

One or more embodiments can make use of software running on a general purpose computer or workstation. With reference to FIG. 1, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 1) running a server program. It will be understood that such a physical server may or may not include a display and keyboard.

one or more embodiments are particularly significant in the context of a cloud or virtual machine environment, although this is exemplary and non-limiting. Reference is made back to FIGS. 1-3 and accompanying text. One or more embodiments utilize scripts running on machines 416, 420, 424, 430, 408, 422, 426, 432 with agents on machines 414, 418, 438, 428, as described elsewhere herein. Scripts and/or agents can also employed in connection with other aspects such as, for example, DR failover manager 410, DR failback manager 599, and/or site-level failback manager 597.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks in the figures; e.g., 408, 414, 416, 420, 422, 410, 424, 426, 430, 432, 597, 599, 912, 914, and/or related scripts and/or agents. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   during normal operation, at a first site, of a disaster recovery management unit comprising at least one customer workload machine and at least one management service machine, replicating to a remote disaster recovery site said at least one customer workload machine, said at least one management service machine, and metadata for said at least one management service machine; and
   after a disaster at said first site:
      bringing up, at said remote disaster recovery site, a replicated version of said at least one customer workload machine;
      bringing up, at said remote disaster recovery site, a replicated version of said at least one management service machine; and
      reconfiguring a replicated version of said metadata for said at least one management service machine by executing on said replicated version of said at least one management service machine a failover script that maps old identities of said at least one customer workload machine to new identities of said at least one customer workload machine, to obtain reconfigured replicated metadata for said replicated version of said at least one management service machine, so that said replicated version of said at least one management service machine can provide said management service to said replicated version of said at least one customer workload machine in said remote disaster recovery site.

2. The method of claim 1, further comprising:
   subsequent to said disaster, upon said first site coming back up, background replicating from said remote disaster recovery site back to said first site a restored version of said at least one customer workload machine, a restored version of said at least one management service machine, and a restored version of said metadata for said at least one management service machine; and
   once said background replication is complete:
      bringing up, at said first site, said restored version of said at least one customer workload machine;
      bringing up, at said first site, said restored version of said at least one management service machine; and
      reconfiguring said restored version of said metadata for said at least one management service machine by executing on said restored version of said at least one management service machine a failback script, to obtain reconfigured restored metadata for said restored version of said at least one management service machine, so that said restored version of said at least one management service machine can provide said management service to said restored version of said at least one customer workload machine in said first site.

3. The method of claim 1, wherein, in said replicating step, said disaster recovery management unit is located within a cloud environment.

4. The method of claim 1, wherein, in said replicating step, said disaster recovery management unit is located within a non-cloud environment.

5. The method of claim 1, wherein, in said replicating step, said at least one customer workload machine and said at least one management service machine comprise physical machines.

6. The method of claim 1, wherein, in said replicating step, said at least one customer workload machine and said at least one management service machine comprise virtual machines executing on one or more physical machines under control of a hypervisor.

7. The method of claim 1, wherein, in said replicating step, said at least one management service comprises monitoring and event management functionality implemented with monitoring and policy mapper servers.

8. The method of claim 1, wherein, in said replicating step, said at least one management service comprises a firewall.

9. The method of claim 8, wherein said reconfiguring step comprises applying a map of said first site to said remote disaster recovery site internet protocol addresses.

10. The method of claim 1, wherein, in said replicating step, said at least one management service comprises patch management.

11. The method of claim 1, wherein, in said replicating step, said at least one management service comprises license management.

12. The method of claim 1, wherein, in said replicating step, said at least one management service comprises asset management.

13. The method of claim 1, wherein said replication comprises asynchronous replication.

14. The method of claim 1, wherein said replication comprises synchronous replication for at least targeted files of said disaster recovery management unit.

15. A non-transitory computer readable storage medium comprising computer executable instructions which when executed by a computer cause the computer to perform the method of:
    during normal operation, at a first site, of a disaster recovery management unit comprising at least one customer workload machine and at least one management service machine, replicating to a remote disaster recovery site said at least one customer workload machine, said at least one management service machine, and metadata for said at least one management service machine; and
    after a disaster at said first site:
        bringing up, at said remote disaster recovery site, a replicated version of said at least one customer workload machine;
        bringing up, at said remote disaster recovery site, a replicated version of said at least one management service machine; and
        reconfiguring a replicated version of said metadata for said at least one management service machine by executing on said replicated version of said at least one management service machine a failover script that maps old identities of said at least one customer workload machine to new identities of said at least one customer workload machine, to obtain reconfigured replicated metadata for said replicated version of said at least one management service machine, so that said replicated version of said at least one management service machine can provide said management service to said replicated version of said at least one customer workload machine in said remote disaster recovery site.

16. The non-transitory computer readable storage medium of claim 15, wherein said computer executable instructions, when executed by said computer, further cause the computer to:
    subsequent to said disaster, upon said first site coming back up, background replicate from said remote disaster recovery site back to said first site a restored version of said at least one customer workload machine, a restored version of said at least one management service machine, and a restored version of said metadata for said at least one management service machine; and
    once said background replication is complete:
        bring up, at said first site, said restored version of said at least one customer workload machine;
        bring up, at said first site, said restored version of said at least one management service machine; and
        reconfigure said restored version of said metadata for said at least one management service machine by executing on said restored version of said at least one management service machine a failback script, to obtain reconfigured restored metadata for said restored version of said at least one management service machine, so that said restored version of said at least one management service machine can provide said management service to said restored version of said at least one customer workload machine in said first site.

17. An apparatus comprising:
    a memory; and
    at least one processor, coupled to said memory, and operative to:
        during normal operation, at a first site, of a disaster recovery management unit comprising at least one customer workload machine and at least one management service machine, replicate to a remote disaster recovery site said at least one customer workload machine, said at least one management service machine, and metadata for said at least one management service machine; and
    after a disaster at said first site:
        bring up, at said remote disaster recovery site, a replicated version of said at least one customer workload machine;
        bring up, at said remote disaster recovery site, a replicated version of said at least one management service machine; and
        reconfigure a replicated version of said metadata for said at least one management service machine by executing on said replicated version of said at least one management service machine a failover script that maps old identities of said at least one customer workload machine to new identities of said at least one customer workload machine, to obtain reconfigured replicated metadata for said replicated version of said at least one management service machine, so that said replicated version of said at least one management service machine can provide said management service to said replicated version of said at least one customer workload machine in said remote disaster recovery site.

18. The apparatus of claim 17, wherein said at least one processor is further operative to:
    subsequent to said disaster, upon said first site coming back up, background replicate from said remote disaster recovery site back to said first site a restored version of said at least one customer workload machine, a restored version of said at least one management service machine, and a restored version of said metadata for said at least one management service machine; and
    once said background replication is complete:
        bring up, at said first site, said restored version of said at least one customer workload machine;
        bring up, at said first site, said restored version of said at least one management service machine; and
        reconfigure said restored version of said metadata for said at least one management service machine by executing on said restored version of said at least one management service machine a failback script, to obtain reconfigured restored metadata for said restored version of said at least one management service machine, so that said restored version of said at least one management service machine can provide said management service to said restored version of said at least one customer workload machine in said first site.

19. The apparatus of claim 17, wherein said disaster recovery management unit is located within a cloud environment.

20. The method of claim 1, further comprising implementing a monitoring service on said management service machine, wherein, in said replicating and reconfiguring steps, said metadata comprises self-contained metadata internally represented in non-relational databases.

* * * * *